(12) United States Patent
DeVoe et al.

(10) Patent No.: US 6,300,709 B1
(45) Date of Patent: Oct. 9, 2001

(54) MICROCHANNEL PLATES (MCPS) HAVING MICRON AND SUBMICRON APERTURES

(75) Inventors: Nelson Christopher DeVoe; Thomas Theodore Mabry, both of Roanoke, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/536,723

(22) Filed: Mar. 28, 2000

Related U.S. Application Data

(62) Division of application No. 08/907,463, filed on Aug. 8, 1997.

(51) Int. Cl.[7] .................................................. H01J 43/00
(52) U.S. Cl. .......................... 313/103 CM; 313/105 CM; 313/534
(58) Field of Search .................... 313/103 CM, 105 CM, 313/105 R, 532, 533, 534

(56) References Cited

U.S. PATENT DOCUMENTS

| 4,264,408 | 4/1981 | Benham . |
|---|---|---|
| 4,283,213 | 8/1981 | Akers et al. . |
| 4,532,171 | 7/1985 | Balkwill . |
| 4,853,020 | * 8/1989 | Sink ......................................... 65/4.1 |
| 5,023,511 | 6/1991 | Phillips . |
| 5,049,176 | 9/1991 | Cook et al. . |
| 5,108,961 | 4/1992 | Zhong et al. . |
| 5,729,244 | * 3/1998 | Lockwood ............................. 345/74 |
| 5,866,901 | * 2/1999 | Penn et al. ........................... 250/281 |

* cited by examiner

Primary Examiner—Nimeshkumar D. Patel
Assistant Examiner—Karabi Guharay
(74) Attorney, Agent, or Firm—McDermott, Will & Emery

(57) ABSTRACT

There is disclosed a three draw technique for drawing optical fibers into various cross-sectional shapes. The process employs a glass tube and rod which are fed into a heated furnace. The viscosity of the glass decreases and the glass flows. The glass is pulled or drawn out of the furnace at a different rate than it is fed into the furnace. The resultant drawn fibers are stacked and the process is repeated two more times. By employing three drawing steps one can achieve extremely small fiber faces. The final draw step uses a hexagonal cross-section preform and fibers. From the first drawn fibers three geometrical shapes can be assembled and finally drawn into hexagonal shapes with round fibers which are triangles, rhombohedrials and half hex or trapezoidal shapes. These shapes maintain the hexagonal closely packed space providing the highest density per cross-section. With this high density there is less glass flowing to fill voids thereby reducing distortion within the fabricated MCP. The final reduction ratio of the starting material to the finished device is the product of each reduction ratio of the individual draw steps.

4 Claims, 4 Drawing Sheets

MICROCHANNEL PLATES (MCPS) HAVING MICRON AND SUBMICRON APERTURES

This application is a Divisional of application Ser. No. 08/907,463 filed Aug. 8, 1997.

FIELD OF THE INVENTION

This invention relates to microchannel plates and more particularly to microchannel plates for use with image intensifiers. A fiber architecture and method of fabrication is described that can Produce micron and submicron microchannel plates (MCPs) with high channel density and uniform channel geometry.

BACKGROUND OF THE INVENTION

An image intensifier tube includes three main components, namely: a photocathode, a phosphor screen (anode), and a microchannel plate (MCP). The MCP is positioned intermediate to the photocathode or anode. The components are usually housed in a tube. As is well known, the photocathode is extremely sensitive to low radiation levels of infrared light in the 580–900 nm (red) spectral range. The MCP is a thin glass plate having an array of microscopic holes through it. Each hole is capable of acting as a channel-type secondary emission electron multiplier. When the microchannel plate is placed in the plane of an electron image in an intensifier tube, one can achieve a gain of up to several thousand or greater. Since each channel in a microchannel plate operates nearly independently of all the others, a bright point source of light will saturate a few channels, but will not spread out over adjacent areas. This characteristic of "local saturation" makes these tubes more immune to blooming at bright areas. It is sufficient to say that the microchannel plate is an extremely important component of an image intensifier and can also be used in conjunction with other devices as photo tubes and so on. Such microchannel plates have been used in image intensifiers for many years and such uses date back to the 1970's.

Techniques used in the manufacture of MCPs are similar to those used for fiber optic plates. Coaxial glass rods, with a soluble etchable glass core, surrounded by an insoluble glass cladding, were drawn down to the required diameter, usually in two stages. The multiple drawn fibers are then fused together and the total bundle sliced into wafer plates and then polished. To finish the channel plates, the core glass is etched out and the remaining channel glass is reduced to form a semiconducting surface on the channel walls. Finally, the electrodes to the plate are added by evaporating nichrome or some other material over the polished faces of the plate. Early microchannels plates were produced by such techniques, and in the 1970's they had thicknesses of about 0.5 mm and a channel diameter of 12 micrometers.

The use of microchannel plates in image intensifiers, as indicated, is widely known and for an example of such an image intensifier with a microchannel plate reference is made to U.S. Pat. No. 5,023,511 entitled OPTICAL ELEMENT OUTPUT FOR AN IMAGE INTENSIFIER DEVICE issued on Jun. 11, 1991 to E. Phillips and assigned to ITT Corporation, a predecessor of the assignee herein.

Basically, MCPs are two dimensional arrays of electron multipliers. An incoming electron enters the input of the MCP striking the channel wall. With voltage applied across the MCP the primary electrons are amplified, generating secondary electrons. The secondary electrons exit the back end of the MCP and diverge or spread out. This divergence increases the spot size of the image spot, and decreases the device resolution. Thus, decreasing the center-to-center spacing and the channel diameter of the MCP, operates to decrease the spread of the electrons. This then operates to increase the resolution of the MCP and therefore, the device the MCP is operating in. As indicated, such devices are image intensifiers, but other devices can be employed as well.

As indicated, the fabrication of MCPs is a fiber drawing process. An etchable core is drawn down with a surrounding lead silicate tube. The single fibers are bundled and redrawn into hexagonal multifibers. The multifibers are packed into a glass tube and then fused together into a solid boule of glass. The boule is sliced and polished into plates. The plates are etched and the core rods are removed leaving the channels. The channels are then activated and metallized. Modern production MCPs, fabricated with a two draw process, have center to center sizes down to 8 microns, with limited production at 6 micron. Smaller and smaller center to center spaced MCPs are needed to improve resolution and MTF in current image intensifiers and devices that use MCPs in imaging applications. The smaller center to center spacing results in smaller channels and the smaller channel focuses the exiting electrons and decreases the size of the imaging spot.

Thus, based on prior art techniques, which are briefly described above, in order to decrease the center to center spacing and the channel diameter, glass fibers must be drawn, stacked, redrawn and stacked again. Current production fiber sizes are very small (0.015") and are difficult to work with. The number of fibers per unit area increases by the inverse square of the center to center spacing, and is currently at 12 million channels per square inch. The small fiber size compounded with the number of fibers, makes fabricating these high resolution, small pore MCPs extremely difficult if not totally impractical.

As the channel decreases in size, the channel wall also decreases. Thus, there is less glass to fill the voids between the fibers. As the glass flows into these voids during the draw and fusion processes, the distance between both the channels and the channel itself will become distorted. In the worst case, several channels will flow together to become one large channel. This leads to non-uniform gain and selective emission points. Thin channels walls will typically break, forming particles that act as electron concentrators and operate to cause spurious emissions.

It is an object of the present invention to produce a fiber architecture that can produce micron and submicron MCPs with high channel density and uniform channel geometry. These MCPs, as indicated, will have improved MTF, resolution and signal-to-noise ratios. The technique to be described includes a method of fabrication to produce micron and submicron MCPs by using a three draw process.

DETAILED DESCRIPTION OF THE INVENTION

Figure 1:
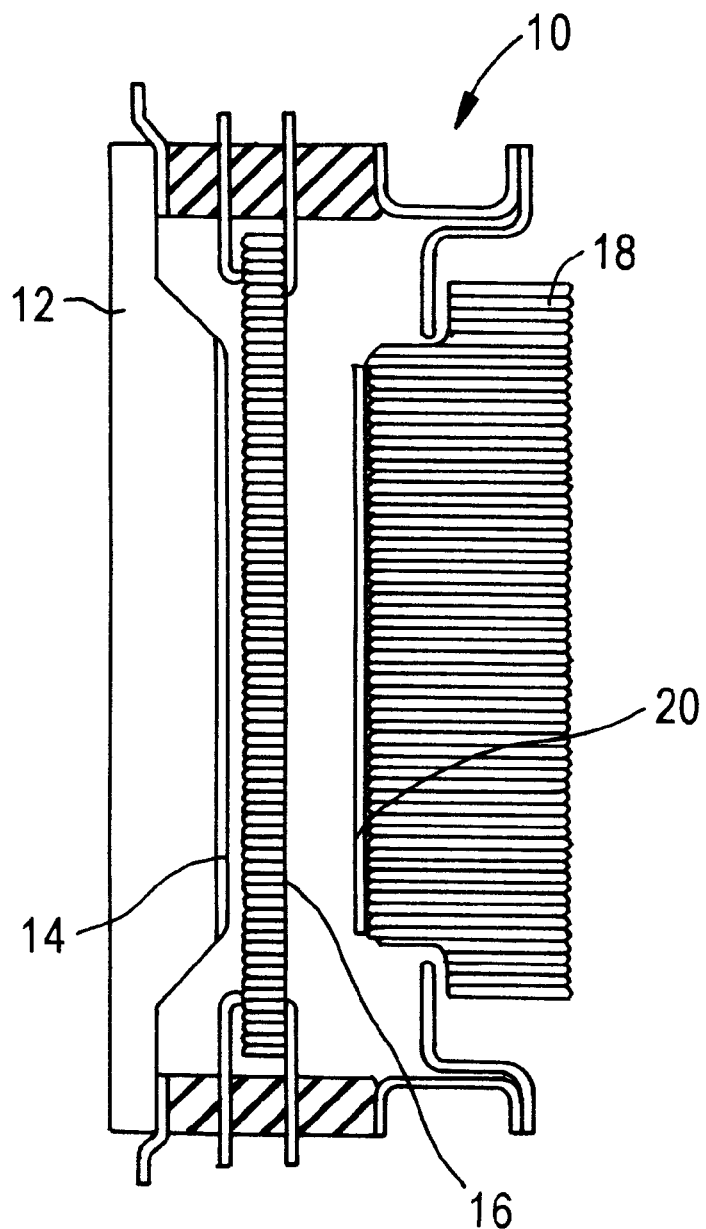
FIG. 1 is a cross-sectional view of a typical prior art image intensifier employing a microchannel plate.

FIG. 1 shows a prior art image intensifier tube 10 having an input window 12 which may be glass or fiber optic, a photoemissive wafer 14 bonded to the window 12, a microchannel plate (MCP) 16 and a output window 18. The output window has a phosphor screen 20 positioned at the surface of the output window adjacent to the microchannel plate 16. The output window 18 is a fiber optic element. As indicated, this is a prior art image intensifier which shows the microchannel plate and the position of the microchannel plate. Reference is made to U.S. Pat. No. 5,023,511, there is shown improvements made to such devices which involve improvements made to the output window and so on. It is apparent that there are many image intensifiers which exist and other devices which use microchannel plates such as the microchannel plate 16, shown.

Figure 2A:
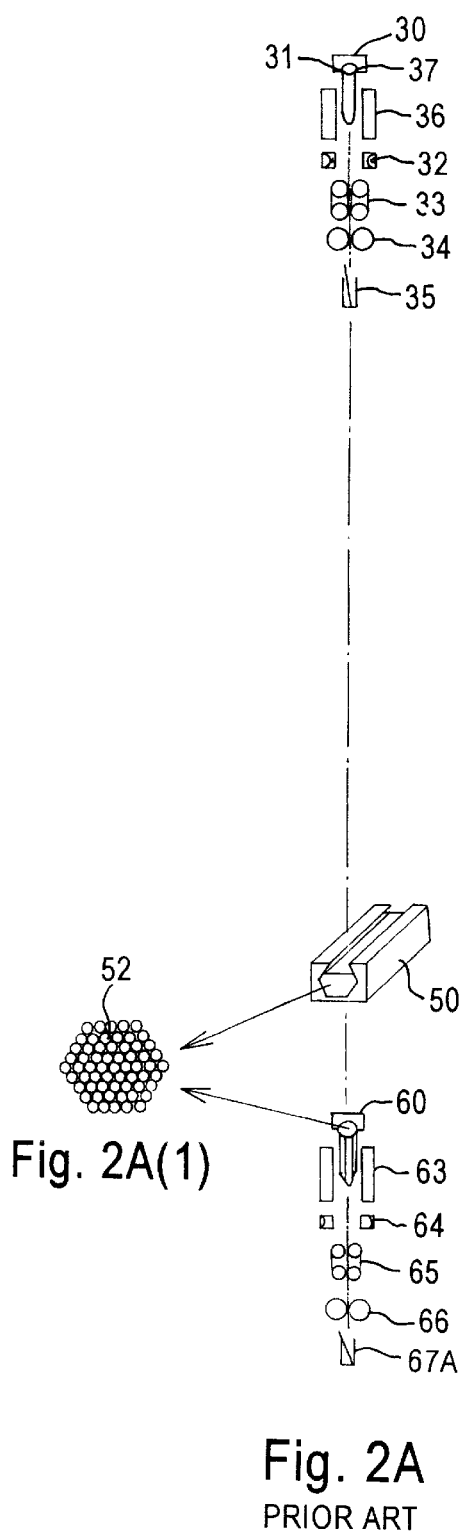
FIG. 2A shows a prior art technique of producing a microchannel plate using a two draw process and FIG. 2A(1) shows an enlarged view of a portion thereof.
Figure 2B:
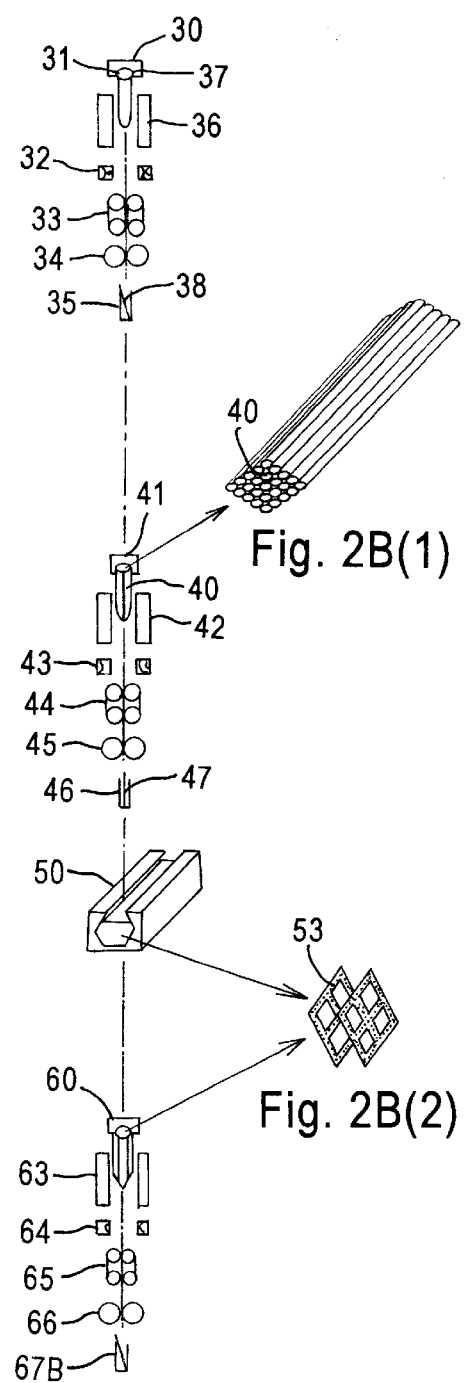
FIG. 2B shows the present invention technique for fabricating a microchannel plate showing a three draw process and FIGS. 2B(1) and 2B(2) show enlarge views of portions thereof.

Referring to FIG. 2, there is shown FIG. 2A and FIG. 2B. FIG. 2A which is at the left of FIG. 2 shows the prior art two draw technique for fabricating microchannel plates using fiber optical elements. FIG. 2B shows the triple draw technique according to the present invention. Similar reference numerals are used to designate similar operating steps and components both on FIG. 2A and 2B.

Referring to FIG. 2A and 2B there is shown a glass infeed member 30. Member 30 accepts a clad glass tube 31 which is secured to the member 30 and which member 30 pushes the glass tube 31 into the furnace depicted by reference numeral 36. The glass tube 31 typically surrounds an etchable core or rod 37 which is fabricated from an etchable glass or other material.

See U.S. Pat. No. 4,283,213 entitled METHOD OF FABRICATION OF SINGLE MODE OPTICAL FIBERS OR WAVEGUIDES issued on Aug. 11, 1981 to F. I. Akers et al. and assigned to a predecessor of the applicant herein. See also U.S. Pat. No. 4,264,408 entitled METHODS FOR APPLYING PHOSPHORS PARTICULARLY ADAPTED FOR INTAGLIATED PHOSPHOR SCREENS by J. D. Benham issued Apr. 28, 1981 to a predecessor of the assignee herein. Both patents show glass and cores used in the production of fiber optics and related devices.

This drawing technique is a conventional technique and is shown both in the prior art and in the present invention. As will be explained, the difference between the prior art and the present invention is that the present invention utilizes a three draw process where the reduction ratio of the fiber is controlled in a precise manner. Again referring to FIG. 2A, the fiber which is pushed into the furnace is then drawn out at a controlled rate by means of a tractor fiber puller 33. Such tractor fiber pullers are well known and manufactured by many companies such as Heathway, Inc. The rate that the fiber is fed into the furnace by means of the glass infeed 30 and the rate that the fiber is pulled out of the furnace by means of the tractor fiber puller 33 is definitive of the reduction ratio. The reduction ratio determines the diameter of the pulled or drawn fiber and is the pull or draw rate divided by the feed rate. Numeral 32 refers to a laser fiber measurement control loop. In essence, the module 32 serves to monitor the rate at which the fiber is being pulled out of the furnace by means of the tractor fiber puller 33 and operates a control loop to control the speed and maintain the reduction ratio relatively constant. The drawn optical fiber is then passed through a fiber cutter 34 which slices the fiber into predetermined lengths where each individual fiber is collected in a fiber collector module 35. For examples of typical components, the clad glass tube 31 is basically 1.6" in outer diameter with a 0.2" thick inner wall. The glass tube is positioned about a 1" etchable core rod 37 which is fabricated from an etchable glass or other material. As the glass is fed into the furnace 36, the viscosity of the glass is decreased and the glass will start to flow or draw. The motorized tractor 33 pulls or draws the glass out of the furnace, past the fiber cutter 34, where is it cut into optical fibers and retained in fiber holder module 35. As indicated, the rate the fiber is pulled out of the furnace 36 versus the rate the glass is fed into the furnace via the feed input 30 is the reduction ratio. Due to the Law of Conservation of Mass, the cross-sectional area or diameter of the glass is reduced by this ratio.

In the prior art process shown in FIG. 2A, the fiber sizes are 0.015" in diameter by 18" long and are round fibers which are collected at 35. The mechanism operates so that the reduction ratio is 10,000. This, as indicated above, is the function of input feed speed and output draw speed.

In FIG. 2B, the tractor fiber puller 33 is operated in the same manner and is controlled by means of the laser fiber measurement control loop 32. The output also passes through a fiber cutter 34. The fibers 38, in regard to the process of FIG. 2B, are 0.25" in diameter by 42" long and are also round fibers. The mechanism in FIG. 2B operates so that the reduction ratio of the fiber is 100 instead of 100. This of course is 100 times less. In FIG. 2A eventually 11,000 fibers are stacked.

Both in the prior art and in the present invention the fibers are stacked. In the enlarged view of FIG. 2B(1), 25 fibers 40 are stacked to form a stacked bundle 42" long which includes 25 fibers or 5 fibers in width and 5 fibers in length. This is a selected geometric stacking arrangement.

The preform or stacked arrangement 40 is formed as a triangle, half hex (trapezoid), or rhombihedrial shaped preform. This is strictly due to the stacking technique 40 and such arrangements can conveniently be made. Three geometric shapes can be assembled and drawn using round fibers. These are triangles, rhombihedrials and trapezoidal shapes. As seen according to the new process, the stacked array 40 or preform is now fed into a furnace 42 by means of a glass infeed 41 and the entire preform 40 is now drawn into new fibers again utilizing a laser control loop 43 and again a tractor fiber puller 44 which operates to control the rate at which the fiber is drawn from the furnace 42 with the input 41 controlling the rate at which the fiber is fed into the furnace. These speeds again produce a reduction ratio of 100. The drawn preform 40 is passed through a fiber cutter 45 and the resultant fibers are deposited in a fiber collector 46. The fiber's deposited in fiber collector 46 are 0.075" in diameter by 18" long and have a triangular, half hex or rhombohedrial shape depending on the stacking configuration 40. As indicated, the reduction ratio is again 100.

The next step in the process is similar for the prior art as well as for this invention. In the prior art, the fibers which are collected through collector 35 then are stacked in a hexagonal preform stacking fixture 50. The stacking fixture 50 accomodates 11,000 round fibers, 50 fibers on 0.75" flat, each on 0.015" outer diameter by 18" long. These fibers are stacked to form a hexagonal array of round fibers as is shown by numeral 53. As one can understand in order to obtain a boule of 11,000 or more individual fibers are stacked in fixture 50. These fibers are extremely difficult to handle and conversely break and fracture reducing the output.

In the present invention, the preform fibers (2B) which are drawn and collected in fiber collector 46 are placed in the hexagonal preform stacking fixture 50. However, only 432 shaped fibers which consist of 12 fibers on a 0.75" flat, each of 0.75" outer diameter by 18" long are stacked to form the arrays shown and indicated by reference numeral 53.

As seen from the enlarged view of FIG. 2A(1), the array 52 is a multiraw hex preform incorporating round fibers. The array 53 in the enlarged view of FIG. 2B(2) is also a multiraw hex shaped preform using shaped fibers as indicated above. The preform fibers 52 are fed into a furnace 63 as are the preform fibers 53. The furnace 63 again has an input feed 60 which controls the rate at which the respective preforms are directed into the furnace and each preform is drawn by means of a tractor puller 65 controlled by a laser control loop 64 past a fiber cutter 66 where the fibers are now cut and collected in a fiber collector 67.

As one can ascertain, the prior art boule which results from the second draw process through furnace 63 and is shown in FIG. 2A consists of a hexagonal array of round fibers which are then placed within an outer glass tubing 68 to form a solid glass boule 69 which can be cut, sliced and further processed to produce microchannel plates or MCPs with the core material etched out. Each fiber is 0.022" in diameter. The new process of FIG. 2B provides a preform 53, having 1,000 hexagonal shaped fibers packed and fused into a solid glass boule. The boule, as indicated, is sliced and processed into 6 microns, center to center MCPs with 4 micron channels. The total combined reduction ratio is about 30 million (both 2A and 2B). The process of FIG. 2B has channel densities of 15–30 million per square inch. The process of FIG. 2A only provides about 12 million channels or less per square inch.

As one will ascertain, the process shown in FIG. 2B is a three draw process which adds an additional draw and assembly process which therefore allows larger and more manageable fiber sizes for stacking. Less fibers are stacked and handled at each assembled step, decreasing the handling and processing difficulty. This allows micron and submicron pitched MCPs to be fabricated.

Figure 3A:
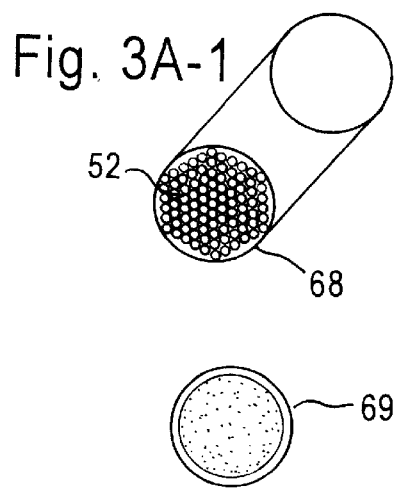
FIG. 3A shows a prior art boule to produce a microchannel plate.

Referring to FIG. 3A there is shown the prior art boule 52 which is used to fabricate MCPs using the two draw process as indicated in FIG. 2. These microchannel plates fabricated from this process have center to center sizes down to 8 microns with limited production at 6 microns. As indicated, smaller and smaller center to center space MCPs are needed to improve resolution and MTF in current image intensifiers and devices that use MCPs in imaging devices. The smaller center to center spacing results in smaller channels. The smaller channel focuses the exiting electrons and decreases the size of the imaging spot.

Figure 3B:
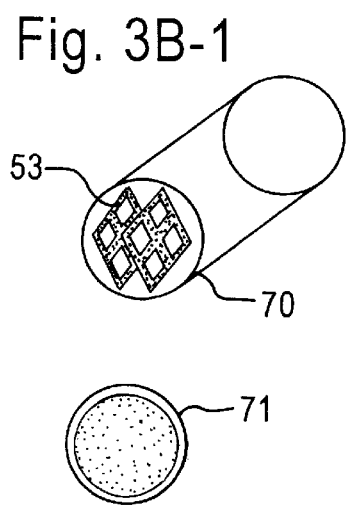
FIG. 3B shows a boule according to the present invention for the production of a microchannel plate.

Referring to FIG. 3B there is shown the boule which is formed according to the three draw process described. The final boule 70 and 71 as shown in FIG. 3B is also sliced and processed but the total combined reduction ratio is about 30 million with channel densities of 15–30 million per square inch. This allows micron and submicron pitched MCPs with high channel densities and uniform channel geometry to be fabricated. In the process of FIG. 2B the number of stacked fibers ranges from 25 (first draw) to 432 (second draw) to 1,000 (third draw) as compared to 11,000 (first draw) and then 1,000, (second draw) round fibers in FIG. 2A.

Figure 4:
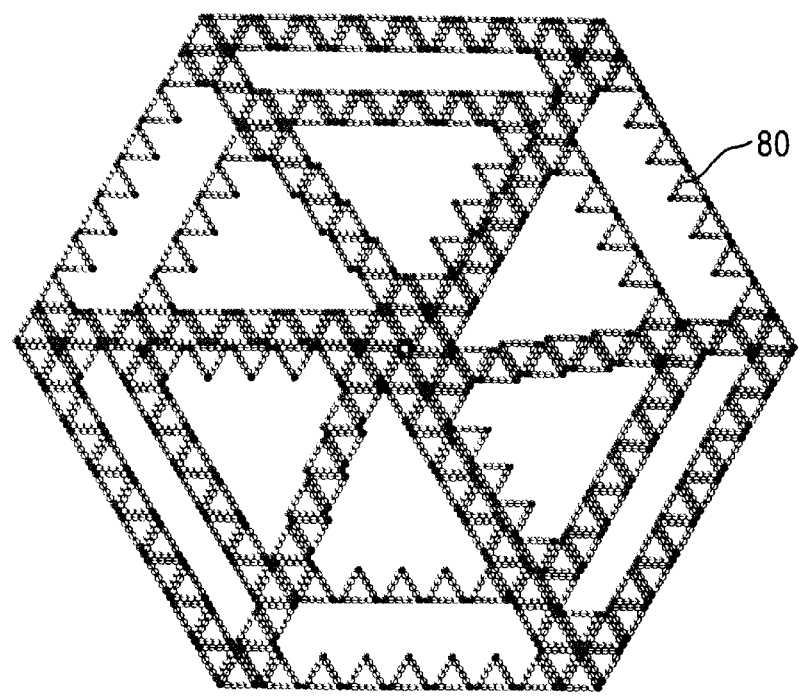
FIG. 4 shows an enlarged view of a hexagonal stacking pattern used according with this invention.

Referring to FIG. 4 there is shown an enlarged view of a hexagonal three draw stacking pattern which is employed with this invention. As one can see from FIG. 4, the pattern 80 is hexagonal and consists of a plurality of stacked, round or otherwise shaped fibers. FIG. 4 shows many white areas which would normally be filled with fibers but are left out for ease of viewing. This stacking pattern would be the pattern that would be drawn through the furnace as for example shown in FIG. 2B as stacking pattern or preform 53. From FIG. 4 one can see how a triangular stack can also be used to form the hexagonal, format. The hexagon core consists of six assembled triangular shapes.

Figure 5:
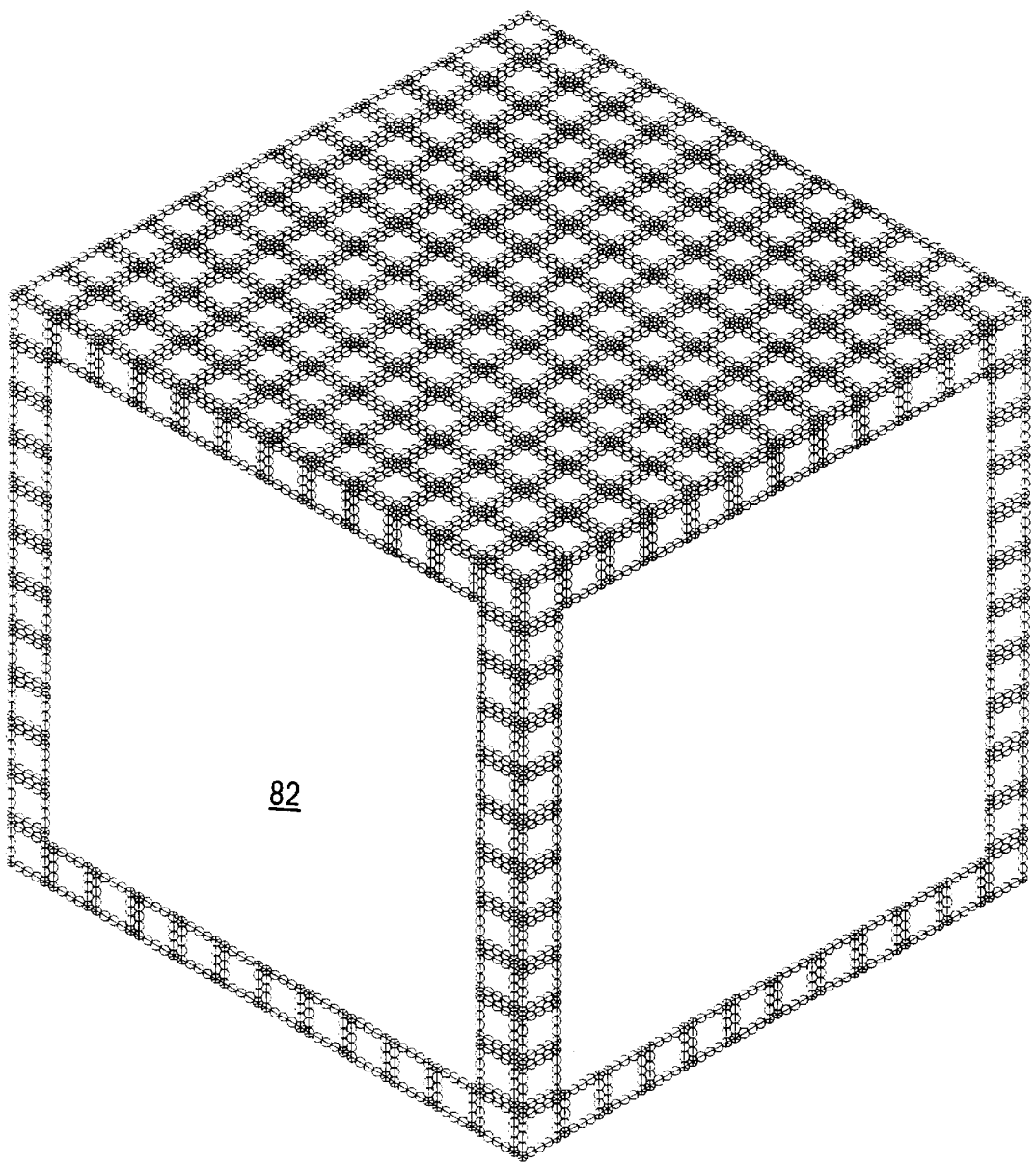
FIG. 5 shows a perspective view, also enlarged, showing a rhombihedrial fiber architecture according to this invention.

Referring to FIG. 5 there is shown a stacking pattern which is rhombihedral. The fiber architecture 82 shown in FIG. 5 is rhombihedral, and again consists of arrays of circular or otherwise shaped fibers which are stacked as shown. This preform is inserted into the furnace and drawn to produce submicron apertures to be used with submicron MCPs.

Thus, as indicated above, the triple draw process allows the use of larger and more manageable fiber sizes for stacking. In this manner, less fibers are stacked and handled at each assembly point, decreasing the difficulty. Furthermore, the architecture which manifests itself in triangular, rhombohedral and trapezoidal fiber shapes enable assembly into a hexagonal cross-section for maintaining the hexagonal close packed spacing between channels. The hexagonal shape allows the highest density per cross-section (90.7%). This, combined with adding an additional draw and assembly process, allows larger and more manageable fiber sizes for stacking. Therefore, the combination of effects, enables one to produce micron and submicron pitched MCPs with high channel densities and uniform channel geometry to be fabricated.

While a major use of MCPs is for image intensifiers, the techniques are applicable in fused fiber optics, flexible fiber optics and MCPs as well. The above-described techniques and apparatus can be used to fabricate an MCP for any high resolution imaging device. It is understood that the process of FIG. 2B could use increased reduction ratios to obtain smaller and smaller center spaces. As previously noted, the smaller center to center spacing results in smaller channels to focus the exiting electrons and decrease the size of the imaging spot. In other words, the techniques disclosed herein can readily be modified by one skilled in the art to further decrease the center spacing and channel size beyond the exemplary disclosed embodiments with a corresponding increase in the channel densities into the billions per square inch.

Whereas conventional drawing techniques are unable to produce MCP channel densities into the billions per square inch due in part to distortion of the channels and breakage of the fibers or channel walls, the methods herein permit increasing channels densities into the billions per square inch by advantageously utilizing additional draw and assembly processes in combination with novel stacking arrangements to overcome the production barriers heretofore limiting in the art.

What is claimed is:

1. A microchannel plate (MCP) for use with an image intensifier or similar device, comprising:
   a wafer fabricated from fused glass fibers, the wafer having channel center to center spacing diameters between about 0.1 micron and 3.5 microns and channel densities between about $6.5 \times 10^7$ to $8.2 \times 10^{10}$ channels/in$^2$.

2. A microchannel plate (MCP) in accord with claim 1, wherein the channel densities are between about $6.5 \times 10^7$ to $1 \times 10^{10}$ channels/in$^2$.

3. A microchannel plate (MCP) in accord with claim 1, wherein the channel densities are between about one billion per square inch and two billion per square inch.

4. A microchannel plate (MCP) in accord with claim 1, wherein the channel densities are between about 65 million per square inch and one billion per square inch.

* * * * *